(12) United States Patent
Kombowski (10) Patent No.: US 8,317,627 B2
(45) Date of Patent: Nov. 27, 2012

(54) INTERMEDIARY FLANGE, COMBINED INTERMEDIARY FLANGE UNIT AND VIBRATION DAMPER

(75) Inventor: Eugen Kombowski, Buehl (DE)

(73) Assignee: Schaeffler Technologies AG & Co. KG (DE)

( * ) Notice: Subject to any disclaimer, the term of this patent is extended or adjusted under 35 U.S.C. 154(b) by 59 days.

(21) Appl. No.: 12/971,219

(22) Filed: Dec. 17, 2010

(65) Prior Publication Data
US 2011/0151981 A1 Jun. 23, 2011

(30) Foreign Application Priority Data
Dec. 22, 2009 (DE) .......................... 10 2009 060 648

(51) Int. Cl.
*F16F 15/121* (2006.01)
(52) U.S. Cl. ...................................... 464/68.1
(58) Field of Classification Search ................. 464/61.1, 464/62.1, 64.1, 66.1, 67.1, 68.1, 68.2, 63.1, 464/65.1, 68.3–68.92; 192/30 V, 55.2–55.7, 192/70.17, 200–214.1; 74/411; D15/147, D15/148
See application file for complete search history.

(56) References Cited

U.S. PATENT DOCUMENTS

| | | | | |
|---|---|---|---|---|
| 4,702,721 A | * | 10/1987 | Lamarche | 464/68.1 |
| 4,947,700 A | * | 8/1990 | Kern et al. | 464/68.9 |
| 5,810,140 A | * | 9/1998 | Billet et al. | 192/205 |
| 6,056,102 A | * | 5/2000 | Ohkubo et al. | 464/68.92 |
| 2007/0051577 A1 | * | 3/2007 | Avins et al. | 192/213.21 |
| 2009/0071786 A1 | * | 3/2009 | Tsuboi et al. | 192/212 |

FOREIGN PATENT DOCUMENTS
DE 102008032008 * 2/2009
* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

An intermediary flange for coupling spring units of damper assemblies connected in series, the intermediary flange comprising: radially extending bars with contact and support surfaces oriented in circumferential direction opposite to one another for supporting end portions of the spring units of the different damper assemblies. The bars are formed by particular bar elements which are aligned and fix in a circumferential direction with respect to their relative positions through attachment at annular disc shaped lateral components axially disposed on both sides.

14 Claims, 4 Drawing Sheets

INTERMEDIARY FLANGE, COMBINED INTERMEDIARY FLANGE UNIT AND VIBRATION DAMPER

CROSS-REFERENCE TO RELATED APPLICATIONS

This application claims priority from German Patent Application No. 10 2009 060 648.3, filed Dec. 22, 2009, which application is incorporated herein by reference in its entirety.

FIELD OF THE INVENTION

The invention relates to an intermediary flange for coupling spring units of damper assemblies connected in series with radially extending bars with contact and support surfaces oriented opposite to one another in a circumferential direction for supporting end portions of spring units of the different damper assemblies.

The invention furthermore relates to a combined intermediary flange-flange unit and a device for damping vibrations, including an intermediary flange of this type or a combined intermediary flange-flange unit.

BACKGROUND OF THE INVENTION

Vibration dampers including two damper assemblies connected in series are known in the art in a plurality of different embodiments. The coupling of the particular damper assemblies is performed through intermediary flanges, which can be configured as floating intermediary flanges. The particular damper assembly forming a damper stage thus includes viewed in force flow direction respectively an input component and an output component, which are coupled with one another through torque transmission devices and/or damping coupling devices, wherein the input component and the output component are disposed coaxial relative to one another and are rotatable in circumferential direction relative to one another within limits. For two damper assemblies arranged in series, the coupling is performed through a flange, which can be configured from lateral disks or can be configured as floating intermediary flange. The intermediary flange is an annular element with radially oriented protrusions, wherein the radially oriented protrusions depending on the arrangement of the annular element and the force flow direction in a vibration damper include bars extending in a radial direction from an outer circumference or also from an inner circumference, wherein the bars include surface portions respectively oriented in circumferential direction opposite to one another, and oriented away from one another, wherein the surface portions function as contact- and support surfaces for the spring units forming torque transmission- and/or damping coupling devices. The particular spring units are preferably supported directly at the contact- and support surfaces. When the flange is configured as a floating intermediary flange, it is fixated in position through the spring units and their additional support at the adjacent damper components. Thus, the intermediary flange is typically disposed between two lateral disks. The support function for the spring units, however, can only be provided in a quite unsatisfactory manner in the center portion of the spring units due to the floating arrangement and the small size of the support surfaces in circumferential direction. When series damper assemblies of this type are used as main dampers in vibration dampers over a large relative rotation angle range, the particular spring units of the respective damper assemblies are relatively large and are disposed on a respectively large diameter, in particular in the portion of the radially exterior extension of the vibration damper. Support in radial direction is provided through the inner or outer circumference of the annular element and the other adjacent damper components, at which the spring units are also provided with support through the openings provided in radial direction. However, the surfaces thus provided do not provide sufficient support or no support in an axial direction, so that herein in particular for larger spring units an undesirable or spring damaging kinking in an end portion in the portion of the contact and support surfaces can be observed.

In order to solve these problems, therefore, an embodiment of the vibration damper with axial support devices for the particular spring units of one or all damper assemblies is proposed in the printed document DE 10 2008 032 008 A1. Thus, the devices can be configured as an integral component of the intermediary flange, and at which the bar forming protrusion of the intermediary flange are formed. Furthermore embodiments with separate support units are conceivable, which are disposed at one of the damper components, preferably at the intermediary flange, and coupled torque proof therewith. These support units can thus form pure axial support surfaces and also combined radial/axial support surfaces. The configuration, arrangement and attachment of the support surfaces, however, is rather complex. Also, manufacturing complexity is increased, since the alignment of the particular support units has to be performed in a particularly precise manner. The axial support surfaces formed by the support units are axially arranged in parallel with the intermediary flange, which has to be considered in the design and with respect to the axial installation space. The attachment is typically performed through non-disengageable connections, preferably form locking through riveting, and is rather complex due to the plurality of support units. The type and arrangement of the attachment, thus also has to be considered in the design of the vibration damper. Due to the relative movement between the spring units and the support units forming lateral surfaces in circumferential direction and the spring units and the other damper components additional frictional work is introduced into the device, which has to be considered when configuring and adjusting the desired characteristic diagram, and it also has to be considered as a parameter causing wear.

Thus, it is the object of the invention to improve a vibration damper, so that the recited disadvantages are avoided and in particular a safe support of the particular spring units can be implemented in axial direction with simple means in a material- and cost saving manner.

SUMMARY OF THE INVENTION

An intermediary flange according to the invention for coupling spring units of damper assemblies connected in series with radially extending bars with contact and support surfaces oriented opposite to one another in circumferential direction for supporting end portions of spring units of the different damper assemblies is characterized according to the invention in that, the bars are formed by particular bar elements, which are aligned and fix in circumferential direction with respect to their relative position through attachment at annular disk shaped lateral components disposed in axial direction on both sides.

The solution according to the invention has the advantage that the intermediary flange though made from a plurality of components, however, the particular bar elements and the annular disk shaped disk components can respectively be configured identical. Configuring the bars from particular bar elements facilitates small compact components which can be configured in a very efficient and material optimized manner from a base material plate, in particular sheet metal. The solution according to the invention furthermore has the advantage that the bar elements when configured as formed sheet metal components can also be made from the waste material left over from producing the other damper components configured as formed sheet metal components, in particular from the waste material portions configured as circular segments when producing the main flanges when machining the openings/pass-through for supporting the spring units on the same arrangement diameter. Thus, their size increases with the arrangement diameter of the spring units.

In one embodiment, devices for axial support are provided at the spring units supported at the devices. The devices can be configured in different manners, and can either be configured as separate components or, according to a particularly preferred embodiment; they can be configured as integral portions at the components forming the intermediary flange. Thus the arrangement and possibly the configuration can be provided either at the bar elements themselves or in a particularly advantageous manner at the annular disk shaped lateral components. The latter option has the advantage that the very simply configured and producible bar elements are moved through displacing the arrangement of the axial support devices into the areas actually to be supported, namely of the spring end portions supported at the bar elements, thus a portion outside of the bar elements.

In another embodiment, the axial support devices are arranged and configured so that they are at least provided for supporting the end portions of the spring units. Thus, they include circumferentially extending support surfaces for supporting at least one axial force component extending at the bar elements and/or at the annular disk shaped lateral components and extending over a partial portion of the spring units supported at the intermediary flange. The axial support devices thus provide axial support surfaces in all embodiments, wherein the axial support surfaces can either be disposed directly parallel to an axial plane or at an angle to the axial plane. However, when aligning the axial support surface, an axial component can always be supported at the axial support surface.

In a further embodiment, the devices include separate elements or multi-component support units, connected with axial annular disk shaped lateral disks or bar elements and axial support surfaces. Using such elements or support units, on the one hand, facilitates optional configuring the intermediate flange with the support units; furthermore it facilitates replacing them in case the connection is disengageable. Another advantage is comprised in that the configuration of the geometry of the support surface can be configured freely and is not tied to a damper component directly, so that intermediary flanges with a plurality of different axial support surfaces configured according to the invention are combinable. The particular support surface is thus characterized among other things by the geometry/shape of the surface, the sizing, in particular extension in circumferential direction, and the orientation, in particular inclination relative to an axial plane.

The above embodiment is characterized by an integral, in particular, one-piece construction of the axial support devices with the annular disk shaped lateral components or the bar elements. Thus, for example, the arrangement is performed at the annular disk shaped lateral components. The support surfaces are configured during the production of the lateral components. Thus, for example, the axial support surfaces are configured through forming in one process step at radially configured protrusions as a function of the embodiment of the intermediary flange configured at the inner or the outer circumference of the annular disk shaped base elements or lateral components. The arrangement of the particular axial support surfaces is thus preferably performed in the extension portion of the bar elements viewed in circumferential direction, in particular beyond the bar elements over a partial portion of the recesses formed between the bar elements for receiving the spring units. The length of the support surfaces is sized in this direction so that it is sufficient at least to support the end portions of the springs.

The configuration of the intermediary flange according to the invention is suitable in particular for configuring intermediary flanges, in which the annular disk shaped lateral components form a base body and the bar elements are disposed so that they extend from the outer circumference of the annular lateral components in a radial direction outward. The configuration according to the invention, however, is also suitable for intermediary flanges, in which the annular disk shaped lateral components form a base body and the bar elements are arranged so that they extend from the inner circumference of the annular lateral components in a radial direction inward. Also, combined configurations are feasible, wherein the bar elements extend in a radial direction inward and outward, like e.g. for parallel damper assemblies. The particular configuration is thus performed as a function of the requirements of the particular case.

For attachment purposes, the particular bar element can be provided with a circular segment shaped attachment portion for arranging the connection with the lateral components disposed on both sides. The attachment portions of the bar elements offset from one another in a circumferential direction are also disposed offset from one another forming intermediary spaces between the bar elements and the lateral components. In this case, there is an option to use the intermediary space for rotation angle limiting. Thus, the particular bar elements include circumferentially oriented stop surfaces with at least one stop surface of another damper component. The receiving and the support of the at least one stop surface of another damper component whose relative rotation angle shall be limited is thus performed between the bar elements and the intermediary cavities formed by the faces of the later disks oriented towards one another. This embodiment helps to omit separate rotation angle limiting devices, since these are also provided by a respective configuration of the particular components of the intermediary flange.

The rotation angle limitation thus operates between the intermediary flange and another damper component, which also has stop surfaces, which interact with the stop surfaces configured at the attachment portions. The other damper component is preferably a damper component of the same damper assembly or a component connected torque proof therewith. The stop surfaces of the other component can extend into the gaps in the base body. The extension either is performed through a respective configuration with lateral engagement, e.g. when the other damper component is disposed in an axial offset plane relative to the intermediary flange or the portions forming the stop surfaces are disposed at bars at the other damper component. The bars are disposed in an axial direction in one plane with the bars of the intermediary flange and/or the annular side components.

In one embodiment, a main flange, for example, the output flange, is configured in an axial plane with the intermediary flange forming a combined intermediary flange-flange unit. The intermediary flange and the main flange with their bars forming the circumferentially oriented contact and support surfaces for the spring units of a damper assembly are oriented in the same radial direction and the intermediary flange is supported at the main flange. The combined intermediary flange-flange unit is characterized in that the bars of the main flange are supported in bar elements disposed offset from one another between the annular disk shaped lateral components and contact surfaces for forming a rotation angle limitation are provided at the bars of the main flange. The contact surfaces are configured towards the bar elements of the intermediary flange.

The solution according to the invention facilitates integrating various functions on minimal installation space with an option for a high degree of variability based on the modular structure.

In another embodiment of the intermediary flange-flange unit, these components respectively form an input and output component of a damper assembly. The configuration of the respective contact and support surfaces acting in a circumferential direction at the spring unit is performed preferably at the bar elements of the intermediary flange, and at bars at the main flange in an integral configuration in radial direction with the same alignment. Thus, the main flange is supported through the intermediary space of the intermediary flange, in particular the intermediary space defined in an axial direction by the annular disk shaped lateral components, and defined in circumferential direction by the bar elements. The assembly into a combined unit is thus performed through joining an annular disk shaped lateral component of the main flange, and simultaneously arranging a particular bar element of the intermediary flange and attaching it through the additional second annular disk shaped component. Thus, besides providing a space saving configuration in axial direction, also the rotation angle limitation can be advantageously integrated into the unit.

The connection between the components forming the intermediary flange, in particular the particular bar elements, and the annular disk shaped components disposed in an axial direction lateral thereto is either performed in a friction locked, form locked or bonded manner. Preferably non-engage able connection in the form of rivet joints is being selected. These can be produced in an ideal manner and have the advantage that the connection is very strong. The solution according to the invention is usable in a particularly advantageous embodiment for applications in vibration dampers with integrated series damper assemblies.

BRIEF DESCRIPTION OF THE SEVERAL VIEWS OF THE DRAWING

The solution according to the invention is subsequently described with reference to drawing figures, wherein.

DETAILED DESCRIPTION OF THE INVENTION

Figure 1A:
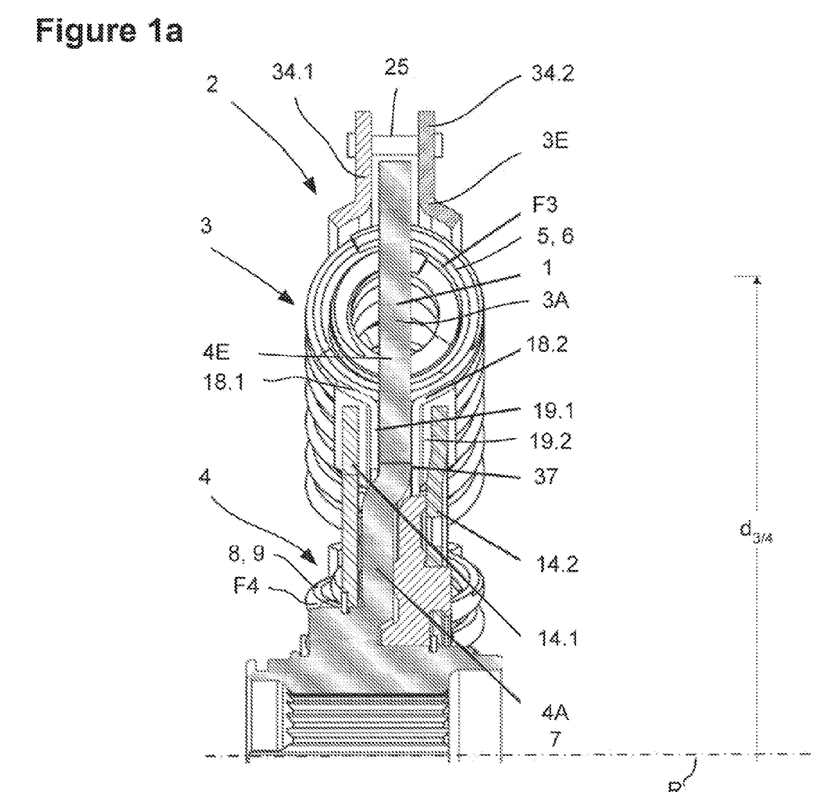
FIG. 1a illustrates a vibration damper with an intermediary flange in an axial view.
Figure 1B:
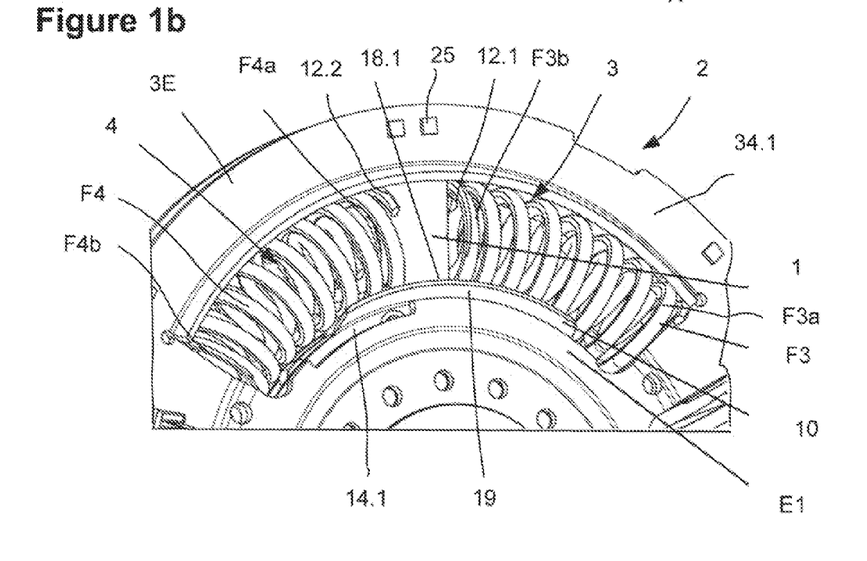
FIG. 1b illustrates a detail of a view from the right of the vibration damper.
Figure 1C:
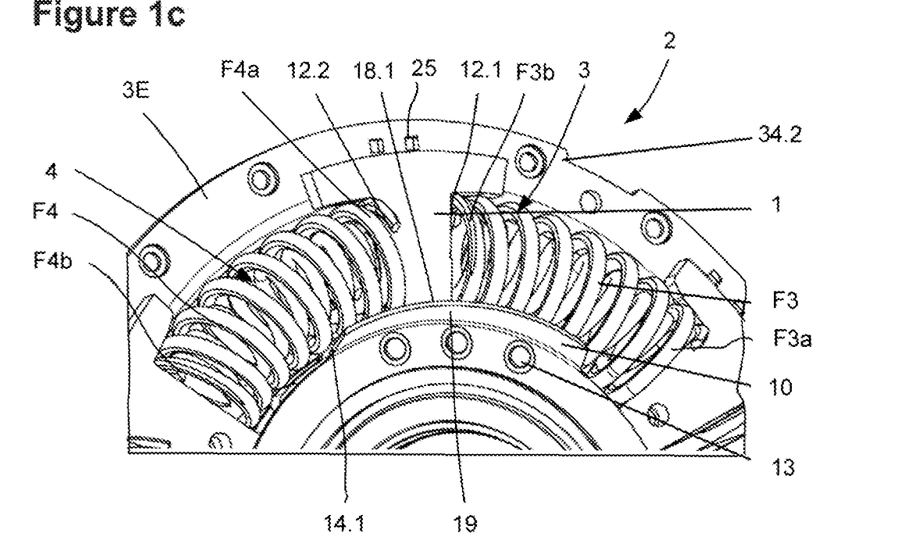
FIG. 1c illustrates a view according to FIG. 1b without an annular disk shaped lateral component.

FIG. 1a illustrates the arrangement and the basic function of an intermediary flange 1 in a vibration damper 2 in an axial sectional view. FIGS. 1b and 1c illustrates details from a view from the right according to FIG. 1a. The subsequent descriptions refer to FIG. 1a-1c.

The vibration damper 2 is configured as a series damper, including at least two damper assemblies 3 and 4 connected in series and coupled to one another through the intermediary flange 1. The damper assemblies 3 and 4 are arranged in the illustrated case in a radial direction on the rotation axis R of the vibration damper 2 on identical arrangement diameters $_{d3/4}$ and disposed in a common axial plane. An axial plane in this context is a plane which can be defined by the rotation axis R and a line perpendicular thereto. In the illustrated case, the axial plane is aligned perpendicular to the illustrated axial sectional plane.

The intermediary flange 1 is a component of each of the damper assemblies 3 and 4 and functions based on the force flow over the damper assemblies as an input or output component of the respective damper assembly 3, 4. Typically, in the illustrated case, the first damper assembly 3 and the second damper assembly 4 are connected in the force flow behind one another, wherein the first damper assembly is connectable torque proof with an input side component which is not illustrated herein and the second damper assembly 4 is connectable torque proof with an output side component which is not illustrated herein. The first damper assembly 3 thus includes an input component 3E and an output component 3A, which are coupled to one another through torque transmission devices 5 and/or damping coupling devices 6. The input component 3E in the illustrated case is formed by two drive disks 34.1, 34.2 connected torque proof with one another through torque connection devices 25, and disposed axially offset to one another. The output component 3A is formed by the intermediary flange 1.

The torque transmission devices 5 and the damping coupling devices 6 are formed in a functional concentration by like components configured as spring units F3 connected parallel to one another. Analogously, this configuration also applies for the second damper assembly 4. The input component 4E is formed herein by the intermediary flange 1, while the output component 4a is formed as an output flange 7 configured as so-called main flange. Also here, the input component 4E is coupled with the output component 4A through torque transmission devices 8 and/or damping coupling devices 9, wherein the function of these devices 8, 9 is taken over by spring units F4. The spring units F3, F4 of the particular damper assembly 3 and 4 are supported with their end portions F3a, F3b, F4a, F4b oriented away from one another respectively at the intermediary flange 1 and at the respective other damper component, thus for the damper assembly 3, the input component 3E and for the damper assembly 4, the output flange 7. Thus, the particular damper components form contact and support surfaces oriented in a circumferential direction. Thus, the end portions F3a of the spring units F3 are supported e.g. at circumferentially oriented contact and support surfaces at the drive disks 34.1, 34.2, the end portions F3b are supported at contact and support surfaces 12.1 at the intermediary flange 1, and the end portions F3a and F3b of the spring units F4 are supported at contact and support surfaces 12.2 and 29.1 at the output flange 7.

An essential technical problem is the support of the spring units F3 and F4. The radial support surfaces are typically supported through radial support surfaces configured at the openings provided in the respective damper component, input component 3E, 4E or output component 3A, 4A, and/or intermediary flange 1 in a radial direction. However, based on the partially very small radial contact surface, no sufficient support of the particular spring units F3 or F4 can be provided by the small radial contact surface. In particular for larger spring units F3, F4 this can cause a kinking in particular in the respective end portions F3a, F3b, F4a, F4b. Thus, devices 10 for axial support of the spring units F3 or F4 are provided at the intermediary flange. In one embodiment, the devices are formed as an integral component of the intermediary flange 1. This means formed thereon, or arranged thereon and attached. Depending on the arrangement and embodiment of the vibration damper 2, the intermediary flange 1 includes bars 11 oriented from an annular disk shaped base body 14 in a radial direction outward or inward, and offset from one another in a circumferential direction. The bars form contact and support surfaces 12.1 and 12.2 oriented in circumferential direction opposite to one another for the respective end portions F3B and F3A of the different spring units F3 and F4. This is apparent from a detail of a view from the right of the vibration damper 2 according to FIG. 1a onto the input component 3E, in particular one of the drive discs 34.1 disposed axially offset from one another.

FIG. 1c thus illustrates the view according to FIG. 1b without an illustration of the drive disc 34.1. Therein only the drive disc 34.2 which is opposed and axially offset from the drive disc 34.1 is visible. Furthermore the axial support devices 10 for the spring units F3, F4 are visible, wherein the support devices are disposed at the intermediary flange 1. The axial support devices are protrusions or extensions 19.1, 19.2 at the intermediary flange 1. The protrusions or extensions form axial support surfaces 18, for example, 18.1, 18.2. The intermediary flange 1 is configured in multiple components and comprises the bar elements 11 and two lateral components disposed adjacent to the bar elements and connected with one another and with the bar elements 11 through connection devices 13, in particular annular disc shaped lateral components 14.1, 14.2 which form the base body 14. The intermediary flange 1 is supported at the output flange 7 through an axial support 37.

Figure 2:
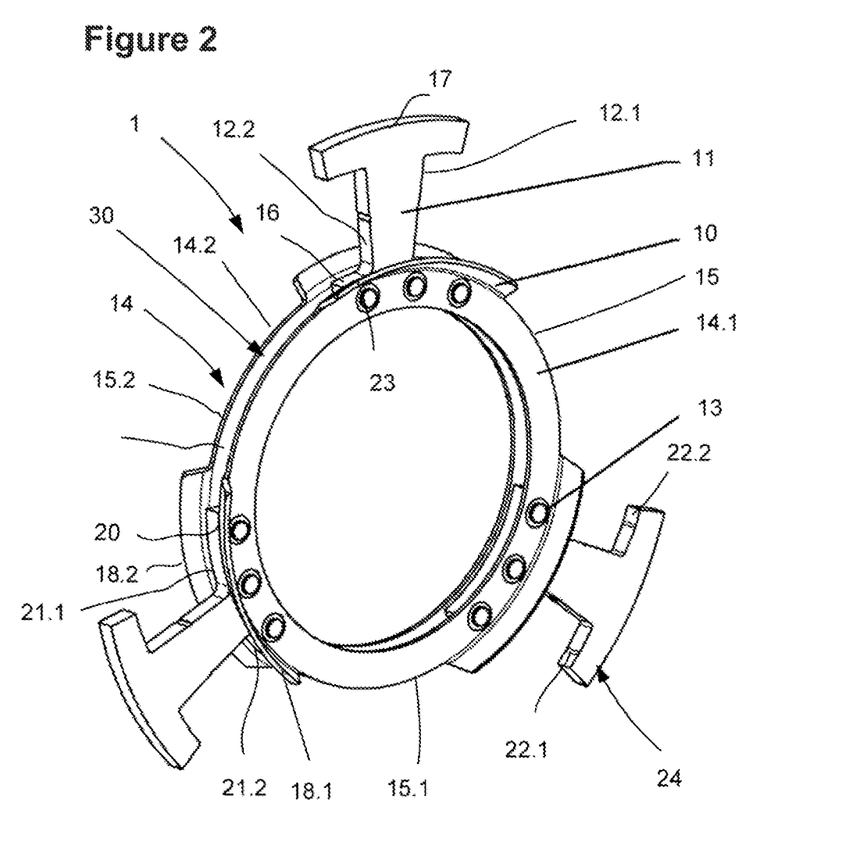
FIG. 2 illustrates the configuration of an intermediate flange in a perspective view.

The basic configuration of an intermediary flange 1 illustrated in FIG. 1a is illustrated in a perspective view in FIG. 2. Thus the intermediary flange 1 is configured in plural components, comprising elements forming the particular bar elements 11, thus in an exemplary manner three bar elements 11 which are configured as discrete component which are disposed an aligned relative to one another so that they form contact and support surfaces 12.1 and 12.2 respectively oriented opposite to one another. The bar elements 11 formed by the particular elements are aligned and fixated relative to one another with respect to their position in a circumferential direction and radial direction by two annular disc shaped lateral components 14.1 and 14.2 which are offset relative to one another in axial direction and disposed on one side of the bar elements 11 and which form at least a two component base bodies 14.

The particular bar elements 11 are configured identical thereto and disposed and aligned with identical distance from one another in circumferential direction. In the illustrated case the arrangement of the bar elements 11 is performed in a radial direction from the outer circumference 15 of the base element 14 and thus of the particular annular disc shaped lateral components 14.1 and 14.2, here in designated as 15.1 and 15.2 extending in a lateral direction. Thus the particular bar elements 11n the portion of their inner circumference 16 are connected through connection devices 13 with the particular annular disc shaped lateral components 14.1 and 14.2 of the annular base element 14. The connection devices 13 can be configured in different manners. Friction locked or form locked connections or also bonded connections are conceivable. In one embodiment, non disengageable connections configured as formed locked connection in particular rivet joints are selected. The particular bar element 11 thus comprises an attachment portion 20 at the inner circumference 16 and furthermore support surfaces 21.1, 21.2 extending in a radial direction in the portion of the inner circumference 16 and 22.1, 22.2 in the portion of the outer circumference 17 in an installed position. They are configured by recesses which are fabricated at the sides of the particular bar elements 11 oriented in a circumferential direction. The bar element 11 then includes a T-shape in a redial direction at the outer circumference 17 and the inner circumference and an installed position wherein the T-shape is characterized by the portions 23 and 24 characterized by a larger extension in circumferential direction than the portions forming circumferentially oriented contact and support surfaces 12.1 and 12.2.

The attachment portion 20 provided in the portion of the largest extension in circumferential direction than the inner circumference 16 then extends over a partial portion in circumferential direction of the annular disc shaped lateral components 14.1 and 14.2. The annular disc shaped lateral component 14.1, 14.2 furthermore includes devices 10 configured as axial support surfaces 18.1 at the annular disc shaped lateral component 14.1 and 18.2 forming radial protrusions 19.1, 19.2 at the annular disc shaped lateral components 14.1. The protrusions are configured so that they form the axial support surfaces. The axial support surfaces 18.1, 18.2 are arranged in circumferential direction with respect to the bar elements 11 so that they are configured to support the end portions of the particular spring units F3, F4. Thus they extend on both sides of the particular bar element 11 beyond its extension in circumferential direction in installed position.

In another embodiment, the axial support surfaces 18.1 and 18.2 are integral components of the respective annular disc shaped lateral components 14.1, 14.2. For this purpose, for example, the particular annular disc shaped lateral components 14.1 and 14.2 are configured as a formed sheet metal component, in particular a stamped component comprising an annular base contour with radial protrusions disposed at an outer circumference which are shaped additionally e.g. by forming radial protrusions in particular through bending them out of the engagement plane in order to thus form the axial support surfaces 18.1 and 18.2. The arrangement of the axial support surfaces 18.1 and 18.2 is thus performed, for example, in the attachment portion of the particular bar element 11 and extends in circumferential direction with respect to the bar element on both sides of the bar element beyond a partial portion of the annular disc shaped lateral components 14.1 and 14.2 wherein the extension in a circumferential direction starting with the bar element 11, for example, the particular contact and support surfaces 12.1 and 12.2 oriented in a circumferential direction is performed through a portion which is configured to respectively support the end portions of the spring units F3 and F4.

The illustrated embodiment is advantageous in particular, since the intermediary flange 1 is made from discrete components which can be joined in a simple manner and which are also arranged and configured so that they include the devices 10 in an integral configuration for axially supporting the spring units. FIG. 2 thus illustrates the basic configuration of the intermediary flange 1 for the configuration according to FIG. 1a as FIG. 1a in installed condition.

The respective damper components of the particular damper assemblies 3, 4 this means the input component 3e and 4e and the output component 3a and 4a are arranged coaxial relative to one another and rotatable within limits relative to one another in circumferential direction. In order to prevent a blockage of the spring units rotation limiting devices are provided. In a further embodiment, the configuration of the intermediary flange 1 in order to integrate rotation limiting devices 26 between the intermediary flange 1 and the output flange 7. Thus the intermediary flange 1 and the output flange 7 are configured as combined intermediary flange/main flange unit 27 according to FIG. 3 so that the circumferentially oriented at surface portions at the intermediary flange 1 and at the output flange 7 function as contact surfaces 28.1, 28.2, 31.1 and 31.2. These are preferably disposed in the portion of the inner circumference 16 of the bar elements 11 and provided on the same arrangement diameter of the output flange 7. Thus one of the stops 28.1, 31.1 or 28.2, 31.2 functions as a pull stop and the respective other stop functions as a push stop.

Figure 3:
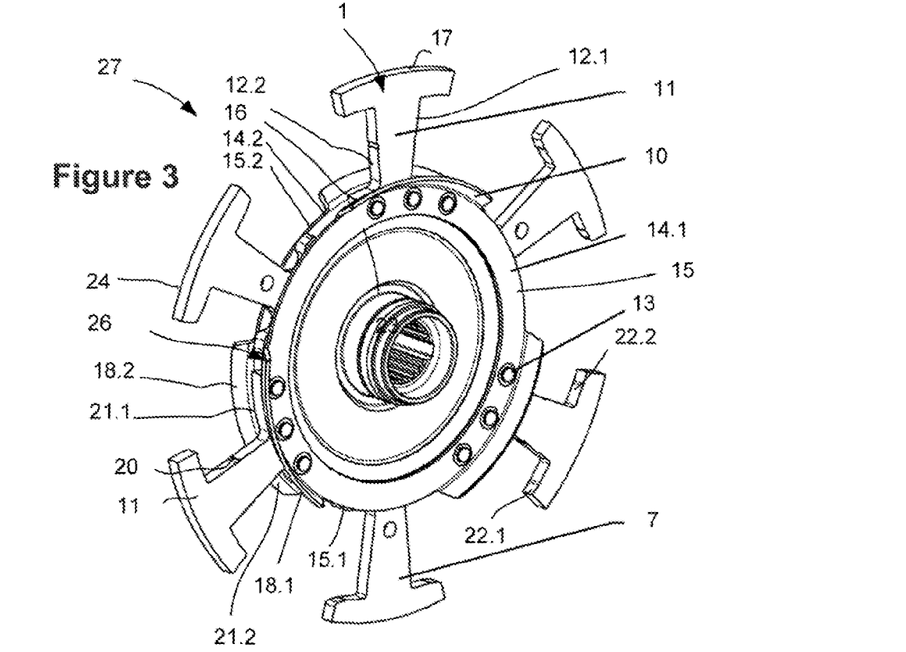
FIG. 3 illustrates a combined intermediary flange/main flange unit.

In one embodiment, the same axial installation space is used for output flange 7 and intermediary flange 1 in that the output flange 7 in the embodiment illustrated in FIG. 1a is supported by the intermediary spaces 30 created through the arrangement of the annular disc shaped lateral components 14.1 and 14.2 on both sides of the bar elements 11. Depending on the configuration of the output flange 7 the assembly of the output flange 7 already has to be performed with the assembly of the intermediary flange 1. Thus FIG. 3 illustrates a combined intermediary flange-main flange unit 27 in a perspective view. The output flange 7 includes an annular disc shaped base body 23 with bar elements 32 extending in a radial direction from the outer circumference. The bar elements 32 are integrally configured at the base elements 33.

Thus it is apparent that the bars 32 extending in a radial direction at the main flange 7 in outward direction which are configured in one piece or integral with the main flange 7 and which form contact and support surfaces 29.1 and 29.2 for the spring units F4 are disposed and supported in the intermediary spaces 30 created by the axially offset arrangement of the annular disc shaped lateral components 14.1 and 14.2 and the only partial extension of the bar elements 11 in circumferential direction. Thus the output flange 7 and the intermediary flange 1 can be disposed in an axial plane. The surface portions of the particular boar elements 11 of the intermediary flange 1. The surface portions are oriented in circumferential direction in the attachment portion 20 thus form the contact and support surfaces 28.1 and 28.2 for rotation angle limitation upon relative rotation in circumferential direction between the intermediary flange 1 and the output flange 7 as input and output components of the second damper assembly 4.

Figure 4A:
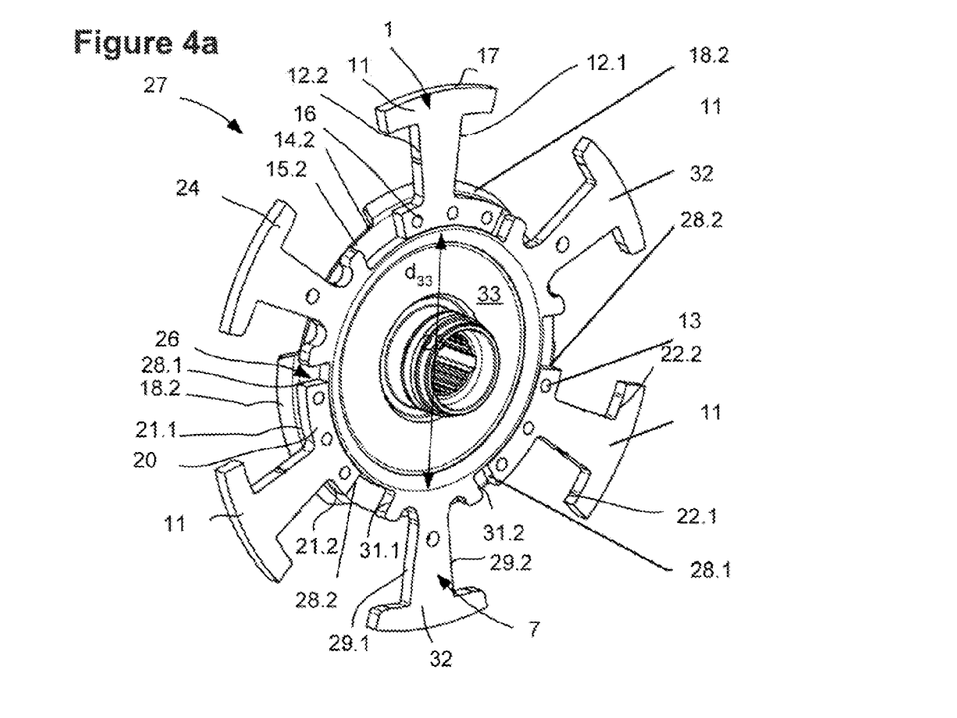
FIGS. 4a, b illustrate the option of producing the components main flange and intermediary flange in a perspective view and a view from the right onto the output flange plane.
Figure 4B:
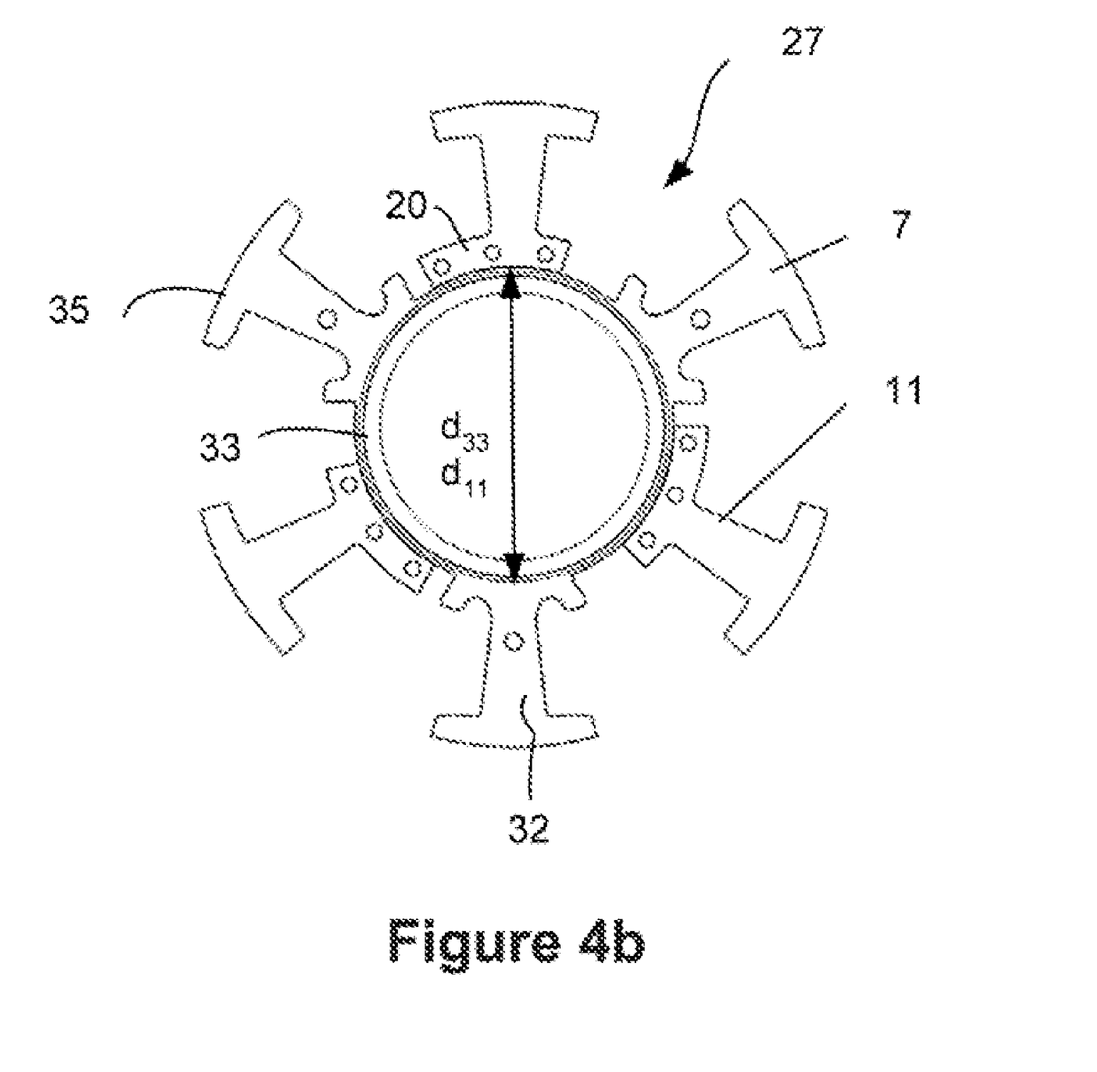

It is furthermore apparent that the diameter characterizing the outer circumferential 35 of the main flange, in particular of the output flange is equal to or greater than the outer diameter of the intermediary flange 1 which is described herein by the outer circumference 17 of the particular bar elements 11. This provides the option to fabricate the particular bar elements 11 of the intermediary flange 1 from the large waste surfaces caused by the production of the output flange 7 through configuring the radially oriented protrusions for the bar elements 32 in one process step. This is apparent in particular from FIGS. 4a and 4b in which the combined intermediary flange-output flange unit 27 according to FIG. 3 is illustrated without an annular disc shaped lateral component 14.1. The base element 33 is characterized by a smaller diameter $d_{33}$ or the same diameter as the arrangement diameter $d_{33}$ of the bar elements 11.

FIG. 4b thus again in a respective view of the intermediary flange-main flange unit 27 emphasizes the option to produce the components in sheet metal construction through a suitable arrangement of the shapes to be cut out.

REFERENCE NUMERALS AND DESIGNATIONS 1 intermediary flange
2 vibration damper
3 first damper assembly
3E input component
3A output component
4 second damper assembly
4E input component
4A output component
5 torque transmission devices for first damper assembly
6 damping coupling devices for first damper assembly
7 output flange
8 torque transmission devices for second damper assembly
9 damping coupling devices for second damper assembly
10 axial support devices for spring units
F3 spring units
F4 spring units
11 bar element
12.1, 12.2 contact and support surface
13 torque proof connection device
14 annular disc shaped base element
14.1, 14.2 annular disc shaped lateral components
15 outer circumference
15.1, 15.2 outer circumference
16 inner circumference of bar elements
17 outer circumference of bar elements
18.1, 18.2 axial support surfaces
19.1, 19.2 protrusion
20 attachment portion
20.1, 20.2 radially oriented support surface at inner circumference
22.1, 22.2 radially oriented support surface at outer circumference
23 portion
24 portion
25 torque proof connection device
26 rotation angle limiting device
27 combined intermediary flange-output flange unit
28.1, 28.2 stop surfaces at intermediary flange
29.1, 29.2 contact and support surface main flange
30 intermediary space
31.1, 31.2 stop surfaces at output flange
32 bar at output flange
33 annular disc shaped base element
34.1, 34.2 drive disc
35 outer circumference
37 axial support
$d_{3/4}$ arrangement diameter for spring units
$d_{11}$ arrangement diameter for bar element
$d_{33}$ outer diameter base element 33
F3 spring units
F4 spring units
F3a, F3b end portion of spring units 3
F4a, F4b end portion of spring units 4
R rotation axis

What I claim is:

1. An intermediary flange for coupling spring units of damper assemblies connected in series, comprising:
radially extending bars;
contact and support surfaces for the radially extending bars oriented in circumferential direction opposite to one another for supporting end portions of the spring units of the different damper assemblies, wherein:

the bars are formed by particular bar elements which are aligned and attached in a circumferential direction with respect to their relative positions through attachment at annular disc shaped lateral components axially disposed on both sides; and, the annular disc shaped lateral components form a base element and the bar elements are disposed, so that they extend from a portion of an outer circumference of the annular disc shaped lateral components in a radial direction outward.

2. The intermediary flange according to claim 1, further comprising devices for axially supporting the end portions of the spring units, the devices arranged at the bar elements and at the annular disc shaped side components forming support surfaces extending in the circumferential direction over a partial portion of the extension of the spring units supported at the intermediary flange, wherein the support surfaces are used for supporting at least an axial force component.

3. The intermediary flange according to claim 2, wherein the devices include separate elements or support units connected with the axial annular disc shaped lateral components or the bar elements and forming axial support surfaces.

4. The intermediary flange according to claim 2, wherein the devices are configured as one component with the annular disc shaped lateral components or the bar elements.

5. The intermediary flange according to claim 1, further comprising devices for axially supporting the end portions of the spring units, the devices arranged at the bar elements or at the annular disc shaped side components forming support surfaces extending in the circumferential direction over a partial portion of the extension of the spring units supported at the intermediary flange, wherein the support surfaces are used for supporting at least an axial force component.

6. The intermediary flange according to claim 5, wherein the devices include separate elements or support units connected with the axial annular disc shaped lateral discs or the bar elements and forming axial support surfaces.

7. The intermediary flange according to claim 5, wherein the devices are configured as one component with the annular disc shaped lateral components or the bar elements.

8. The intermediary flange according to claim 1, wherein:
the particular bar element is configured and arranged so that it includes an annular segment shaped attachment portion for arranging the connection with the lateral components disposed on both sides;
the attachment portions of the particular bar elements are arranged and configured, so that they form circumferentially oriented stop surfaces for a rotation angle limitation with a stop surface of another damper component whose relative rotation angle shall be limited; and,
intermediary spaces for receiving and supporting the respective stop surface of stop surface of another damper component are configured by two bar elements disposed offset from one another in a circumferential direction with faces of the lateral components oriented towards one another.

9. A combined intermediary flange—flange unit comprising the intermediary flange according to claim 1 and a main flange, wherein the intermediary flange and the main flange are provided with circumferentially oriented bar elements and bars, respectively, forming contact and support surfaces for the spring units of a damper assembly, are radially oriented in the same direction and the intermediary flange is supported at the main flange.

10. The combined intermediary flange—flange unit according to claim 9, wherein:

the bars of the main flange are supported in intermediary spaces configured between the annular disc shaped lateral components and the bar elements arranged offset from one another in a circumferential direction;
contact surfaces are provided at the bars of the main flange and oriented towards the bar elements of the intermediary flange: and,
the contact surfaces are configured to provide a rotation angle limitation.

11. A vibration damper comprising at least two damper assemblies connected in series and coupled with one another through an intermediary flange, wherein:
torque transmission devices and damping coupling devices of the damper assemblies are formed by spring units and devices for axially supporting the spring units at the intermediary flange; and,
the intermediary flange is configured according to claim 1.

12. A vibration damper comprising at least two damper assemblies connected in series and coupled with one another through an intermediary flange, wherein:
torque transmission devices or damping coupling devices of the damper assemblies are formed by spring units and devices for axially supporting the spring units at the intermediary flange; and,
the intermediary flange is configured according to claim 1.

13. An intermediary flange for coupling spring units of damper assemblies connected in series, comprising:
radially extending bars; and,
contact and support surfaces for the radially extending bars oriented in circumferential direction opposite to one another for supporting end portions of the spring units of the different damper assemblies, wherein:
the bars are formed by particular bar elements which are aligned and attached in a circumferential direction with respect to their relative positions through attachment at annular disc shaped lateral components axially disposed on both sides;
the particular bar element is configured and arranged so that it includes an annular segment shaped attachment portion for arranging the connection with lateral components disposed on both sides;
the attachment portions of the particular bar elements are arranged and configured, so that they form circumferentially oriented stop surfaces for a rotation angle limitation with a stop surface of another damper component whose relative rotation angle shall be limited; and,
intermediary spaces for receiving and supporting the respective stop surface of stop surface of another damper component are configured by two bar elements disposed offset from one another in a circumferential direction with faces of the lateral components oriented towards one another.

14. A single stage damper, comprising:
an axis of rotation;
an output component;
an input component including first and second drive discs arranged to receive torque and forming an outer circumference of the single stage damper;
only one single plurality of spring units, every spring unit in the only one single plurality of spring units:
at a first radial distance, orthogonal to the axis of rotations, from the axis of rotation; and,
engaged with the first and second drive discs and arranged to receive torque from the first and second drive discs; and, a combined flange unit arranged to transmit torque to the output component and including:
a plurality of bar elements with:
respective first portions extending in a radial direction orthogonal to the axis of rotation from respective first ends closest to the axis of rotation to respective second ends furthest from the axis of rotation; and,
respective second portions at the respective second ends and extending beyond the respective first portions in a circumferential direction defined by a circular line at a fixed distance from the axis of rotation; and, first and second annular disc shaped lateral components separately formed from the plurality of bar elements, wherein:
the plurality of bar elements is engaged with the plurality of spring units; and,
the respective first end of each bar element is fixed to the first and second annular disc shaped lateral components.

\* \* \* \* \*